Figure 3:
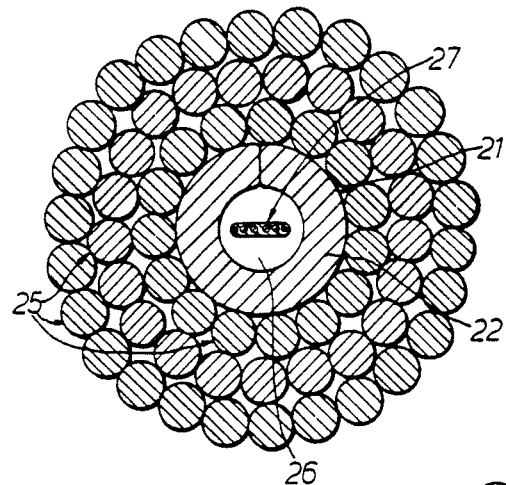

United States Patent [19]

Taylor

[11] Patent Number: 4,632,506

[45] Date of Patent: Dec. 30, 1986

[54] OVERHEAD FLEXIBLE ELECTRIC CONDUCTOR

[75] Inventor: John E. Taylor, Berkshire, England

[73] Assignee: BICC Public Limited Company, London, England

[21] Appl. No.: 620,427

[22] Filed: Jun. 14, 1984

[30] Foreign Application Priority Data

Jun. 17, 1983 [GB] United Kingdom ............... 8316494

[51] Int. Cl.⁴ ............................................. G02B 6/44
[52] U.S. Cl. ........................... 350/96.23; 174/40 R; 174/41; 174/70 R; 174/108
[58] Field of Search ............... 350/96, 23; 174/70 R, 174/70 A, 40 R, 41, 108

[56] References Cited

U.S. PATENT DOCUMENTS

| | | | |
|---|---|---|---|
| 4,078,853 | 3/1978 | Kempf et al. | 350/96.23 |
| 4,178,069 | 12/1979 | Andersen et al. | 350/96.23 |
| 4,188,088 | 2/1980 | Andersen et al. | 350/96.23 |
| 4,199,225 | 4/1980 | Slaughter et al. | 350/96.23 |
| 4,359,598 | 11/1982 | Dey et al. | 174/40 R |
| 4,372,792 | 2/1983 | Dey et al. | 350/96.23 X |
| 4,416,508 | 11/1983 | Dey et al. | 350/96.23 |

FOREIGN PATENT DOCUMENTS

| | | |
|---|---|---|
| 0081327 | 6/1983 | European Pat. Off. |
| 1419220 | 12/1975 | United Kingdom . |
| 1598438 | 9/1981 | United Kingdom . |
| 2110415 | 6/1983 | United Kingdom . |
| 2127578 | 4/1984 | United Kingdom . |

OTHER PUBLICATIONS

Igarashi et al, "Composite Fiber-Optic Overhead Ground Wire," *Proc. of 29th Int. Wire & Cable Symp.*, Cherry Hill, N.J., Nov. 1980, pp. 312-321.

*Primary Examiner*—John Lee
*Attorney, Agent, or Firm*—Buell, Ziesenheim, Beck & Alstadt

[57] ABSTRACT

An electric conductor suitable for use in an overhead electrical and optical transmission system comprises a layer or layers of helically wound wires, at least one elongate compartment within and extending throughout the length of the conductor and, loosely housed in the elongate compartment, at least one optical fibre ribbon structure comprising a plurality of optical fibres and flexible elongate reinforcing elements of resilient material arranged side by side and embedded in an elongate body of plastics material, each resilient reinforcing element being set in such a form that the ribbon structure follows a path of smoothly curved undulations whose axes of curvature lie parallel to one another and normal to the longitudinal axis of the ribbon structure. If, when the conductor is installed or in service, the undulating ribbon structure is subjected to a tensile force, the ribbon structure will straighten in a lengthwise direction against the action of the undulating resilient reinforcing elements thereby reducing the tensile force otherwise applied to the optical fibres and, when the tensile force is removed, the ribbon structure will return towards its original undulating form.

21 Claims, 5 Drawing Figures

U.S. Patent   Dec. 30, 1986   Sheet 1 of 2   4,632,506
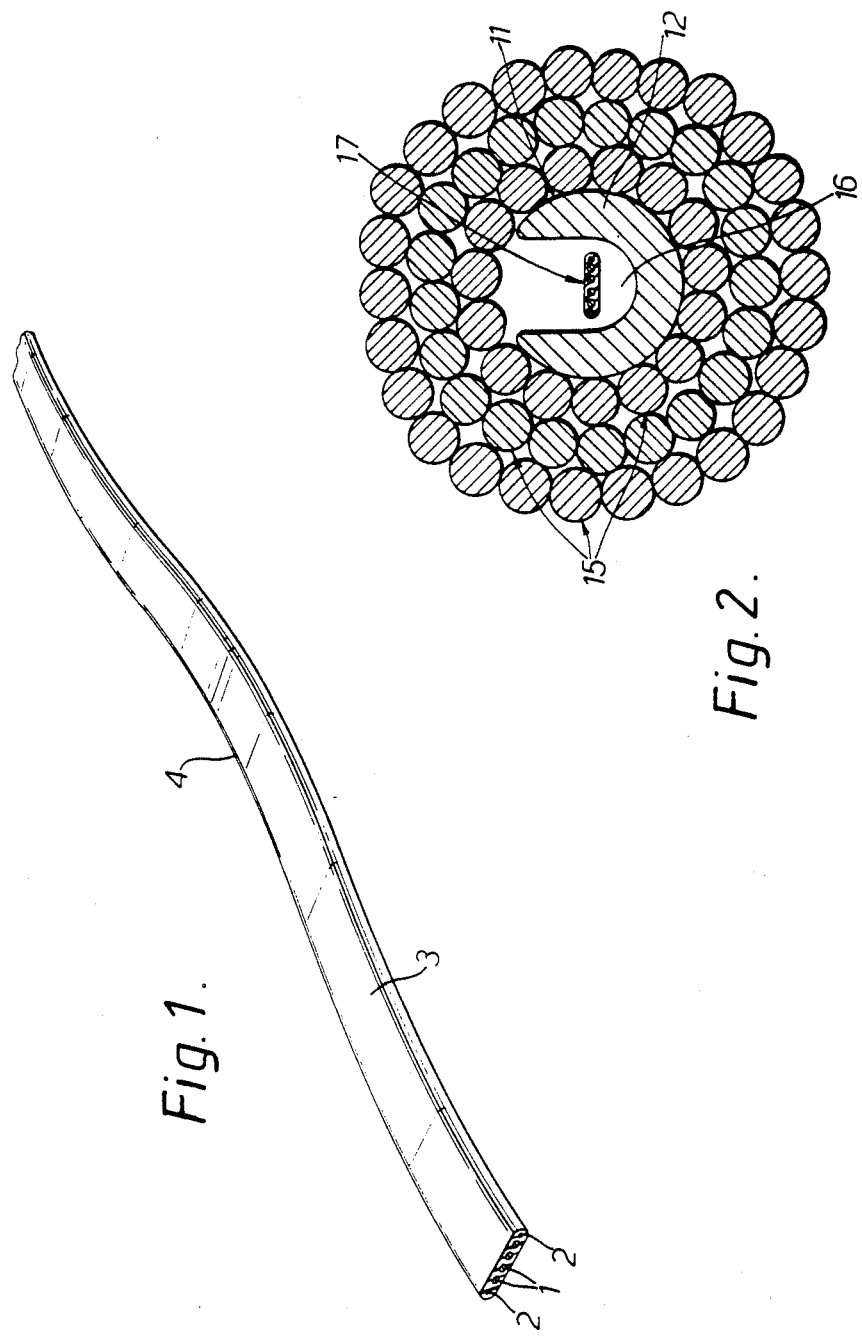

OVERHEAD FLEXIBLE ELECTRIC CONDUCTOR

This invention relates to overhead flexible electric conductors of the kind which comprise one or more than one layer of helically wound bare elongate elements of electrically conductive metal or metal alloy and which are adapted to be freely suspended from spaced supports in long lengths.

In the Complete Specification of our Patent No. 1,598,438 there is described and claimed an overhead electric conductor comprising at least one layer of helically wound bare elongate elements of metal or metal alloy, at least one elongate compartment within and extending throughout the length of the conductor and, loosely housed in the elongate compartment or at least one of the elongate compartments, at least one separate optical fibre and/or at least one optical bundle.

It is an object of the present invention to provide an improved overhead flexible electric conductor which incorporates a plurality of optical fibres.

According to the invention, the improved overhead flexible conductor comprises at least one layer of helically wound bare elongate elements of metal or metal alloy, at least one elongate compartment within and extending throughout the length of the flexible conductor and, loosely housed in the elongate compartment, at least one optical fibre ribbon structure, which optical fibre ribbon structure comprises a plurality of optical fibres and at least one flexible elongate reinforcing element of substantially resilient material arranged side by side and embedded in an elongate body of plastics material, the or each resilient reinforcing element of the optical fibre ribbon structure being pre-set in such a form that the ribbon structure as a whole follows a path of smoothly curved undulations whose axes of curvature lie transverse to the longitudinal axis of the ribbon structure and the arrangement being such that if, when the conductor is installed or is in service, the undulating ribbon structure is subjected to a tensile force, the ribbon structure will straighten in a lengthwise direction against the action of the undulating resilient reinforcing element or elements, thereby reducing the tensile force otherwise applied to the optical fibres and, when the tensile force is removed, the ribbon structure will return towards its original undulating form.

Preferably, the axes of curvature of the undulations of the undulating ribbon structure lie parallel to one another and substantially normal to the longitudinal axis of the optical fibre ribbon structure.

The or each undulating optical fibre ribbon structure loosely housed in the elongate compartment or at least one of the elongate compartments of the flexible conductor preferably includes two or more than two flexible elongate reinforcing elements of substantially resilient material uniformly spaced across the width of the ribbon structure. In a preferred embodiment, the undulating optical fibre ribbon structure includes two flexible resilient reinforcing elements between which the separate optical fibres are arranged side by side.

The flexible resilient reinforcing elements of the or each undulating optical fibre ribbon structure may be of a metal or metal alloy, copper or stainless steel being preferred, but, preferably, the reinforcing elements are made of a non-metallic resilient material such a polyethylene terephthalate.

For optical fibres having an overall diameter of 250 micrometers, preferably the radius of curvature of each undulation of the or each undulating optical fibre ribbon structure is not less than 40 mm.

The undulating optical fibre ribbon structure as above described is the subject of my co-pending U.S. patent application Ser. No. 620,426 filed on the same day as the present application.

By virtue of being housed loosely in the elongate compartment, limited relative movement between the or each undulating optical fibre ribbon structure and the overhead flexible electric conductor can take place when the conductor vibrates, oscillates or is otherwise flexed as may, for example, occur when the freely suspended flexible conductor is subjected to winds. Limited relative movement between the or each undulating optical fibre ribbon structure and the flexible conductor can also occur when the conductor is subjected to a changing tensile load during and after its installation due to forces imposed on it by winches and brakes, etc. which are used in tensioning the conductor to obtain a predetermined sagging condition; after installation, changes in tensile load in the flexible conductor can also occur due to changes in external loading and in temperature. Limited relative movement between the or each undulating optical fibre ribbon structure and the flexible conductor can also occur while the conductor is in service and creep gives rise to non-elastic extension of the conductor. In any of these situations, in the event that a tensile force applied to the flexible conductor is transferred, at least in part, to the loosely housed undulating optical fibre ribbon structure, the ribbon structure will straighten in a lengthwise direction against the action of the undulating resilient reinforcing element or elements to reduce any tensile force that might otherwise be applied to the optical fibres and, after the tensile force is removed, the ribbon structure will return towards its original undulating form.

In one preferred aspect of the invention, an elongate compartment is within and extends throughout the length of a substantially circumferentially rigid central core of the flexible conductor and the or each layer of helically wound bare elongate elements of metal or metal alloy surrounds the central core. In one preferred embodiment of this aspect of the invention, the central core is a single extruded elongate member having a central bore which constitutes the elongate compartment. The single elongate member initially may be of substantially U-shaped transverse cross-section, one or each of the limbs of the U being folded inwardly so that the gap between the free ends of the limbs is at least partially closed, the space between the limbs and the base of the U constituting the elongate compartment; alternatively, the central core initially may be a longitudinally extending tape of metal or metal alloy transversely folded to form a tube, the abutting longitudinally extending edges of the tape being welded or otherwise secured together. In all cases, preferably the central core is of substantially circular transverse cross-section.

Alternatively, the central core may be in the form of any one or more of the optional constructions described and illustrated in the Complete Specification of our Pat. No. 1598438.

In a further aspect of the present invention, the central core consists of two separately formed parts and comprises an inner solid elongate member of metal or metal alloy having in its outer surface at least one longitudinally extending recess and, surrounding the inner elongate member, a longitudinally applied, transversely folded tape of metal or metal alloy, which tape overlies the or each longitudinally extending recess to form an elongate compartment. Preferably, the inner elongate member has in its outer surface three or four circumferentially spaced, longitudinally extending recesses which, when surrounded by the transversely folded tape, constitute circumferentially spaced elongate compartments in at least one of which an undulating optical fibre ribbon structure is loosely housed.

In a still further aspect of the present invention, the central core is of aluminium or an aluminium-based alloy; at least one layer of bare elongate elements of steel surrounds the central core; and at least one substantially circumferentially continuous outer layer of aluminium or an aluminium-based alloy surrounds the layer or layers of steel bare elongate elements, aluminium or aluminium-based alloy of the central core and/or of the outer layer at least partially filling interstices between the steel bare elongate elements. In this case, the central core may comprise at least one layer of bare elongate elements of aluminium or an aluminium-based alloy, each element having a transverse cross-section approximating to a sector of an annulus or having a transverse cross-section of such a shape that, when the flexible elongate body is in tension, said element is in inter-facial engagement with adjacent bare elongate elements.

In all cases, those parts of the or each elongate compartment not occupied by the undulating optical fibre ribbon structure or structures may be substantially filled with a silicone gel or with a water-impermeable medium of a greaselike nature, the silicone gel or the greasy water-impermeable medium being of such a consistency that the or each undulating optical fibre ribbon structure is free to move relative to the flexible conductor when the flexible conductor vibrates, oscillates or is otherwise flexed. The greasy water-impermeable medium may consist of, or may comprise as a major constituent, petroleum jelly.

In some circumstances, an electric current flowing for a limited period along the flexible conductor, as may occur as a result of a fault or lightning, may be of such a value that there is the risk that heat generated during passage of the current will be conducted to the or a ribbon structure and to the optical fibres and will result in damage to the ribbon structure or such damage to each optical fibre that its light-transmission efficiency is reduced to an undesirable extent. For example, the generated heat may cause the plastics material of the ribbon structure to soften and consequentially exert such pressure on the optical fibres in the ribbon structure as to reduce their light-transmission efficiency to an undesirable extent.

Accordingly, in some circumstances, a layer of thermally insulating material may be housed in the elongate compartment and surround the undulating optical fibre ribbon structure or structures. Preferably, the thermally insulating layer is a circumferentially continuous layer which is bonded or otherwise adheres to the boundary surface of the elongate compartment. The layer of thermally insulating material may be firmly bonded to substantially the whole of the boundary surface area of the elongate compartment, or the layer of thermally insulating material may be bonded to mutually spaced portions of the boundary surface area, any air between the thermally insulating layer and the boundary surface serving as additional thermal insulation. The layer of thermally insulating material is preferably a coating of plastics thermally insulating material such as silicone rubber, polytetrafluoroethylene and other fluoroethylene polymers and co-polymers, polyetheretherketone, polycarbonates, polysulphones, polyesters and Kevlar. For enhanced thermal insulation, these plastics materials may be in cellular form.

The invention is further illustrated by a description, by way of example, of a preferred undulating optical fibre ribbon structure for use in an overhead flexible electric conductor and of four preferred forms of overhead flexible electric conductors incorporating an undulating optical fibre ribbon structure or undulating optical fibre ribbon structures, with reference to the accompanying drawings, in which:

FIG. 1 is an isometric diagrammatic view, drawn on an enlarged scale, of the preferred undulating optical fibre ribbon structure, and FIGS. 2 to 5 are transverse cross-sectional views of the four preferred forms of overhead flexible electric conductors.

Referring to FIG. 1, the preferred undulating optical fibre ribbon structure comprises four optical fibres 1 and two resilient elongate elements 2 of polyethylene terephthalate arranged side by side and embedded in an elongate body 3 of silicone acrylate, the four optical fibres being arranged between the two polyethylene terephthalate elements. Each of the optical fibres 1 has an overall diameter of 250 $\mu$m. Each of the polyethylene terephthalate elements 2 has a diameter of 200 $\mu$m. Each polyethylene terephthalate element 2 is set in such a form that the ribbon structure follows a path of smoothly curved undulations 4 which have radii of curvature of approximately 40 mm and whose axes of curvature lie parallel to one another and substantially normal to the longitudinal axis of the optical fibre ribbon structure. When the undulating ribbon structure is subjected to a tensile force, the ribbon structure straightens in a lengthwise direction against the action of the undulating polyethylene terephthalate elements 2 thereby reducing the tensile force that would otherwise be applied to the optical fibres 1. After the tensile force is removed, the resilient polyethylene terephthalate elements 2 cause the ribbon structure to return towards its original undulating form. The undulating optical fibre ribbon structure has an overall width of 1.6 mm and an overall thickness of 0.3 mm.

The overhead flexible electric conductor shown in FIG. 2 comprises a central core 11 constituted by a single extruded elongate aluminium alloy member 12 of substantially U-shaped transverse cross-section, the space 16 between the limbs of the U constituting an elongate compartment. The central core 11 is surrounded by three layers 15 of helically wound round wires of aluminium-based alloy, the directions of lay of adjacent layers being of opposite hand. Loosely housed in the elongate compartment 16 is an undulating optical fibre ribbon structure 17 as shown in FIG. 1.

Figure 4:
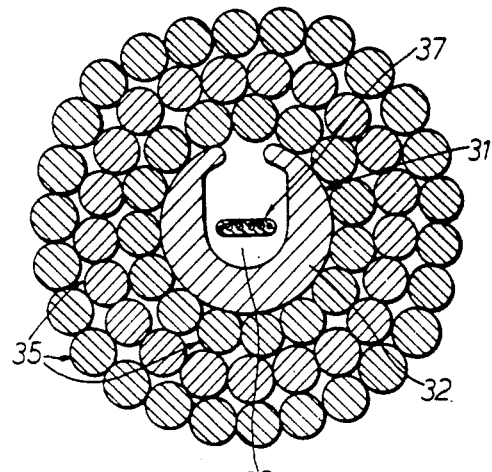

The overhead flexible electric conductors shown in FIGS. 3 and 4 are similar in construction to the overhead flexible electric conductor shown in FIG. 2 except for the form of the central core and, for convenience, components of the flexible conductors shown in FIGS. 3 and 4, respectively, that are similar to those of the overhead conductor shown in FIG. 2 have been given references greater by ten and by twenty than the references of the corresponding components of the flexible conductor shown in FIG. 2. In the overhead electric conductor shown in FIG. 3, the central core 21 is a tube 22 formed by transversely folding a strip of aluminium-based alloy. In the flexible conductor shown in FIG. 4, the central core 31 is constituted by a single extruded elongate aluminium alloy member 32 of substantially U-shaped cross-section, the gap between the free ends of the limbs of the U being partially closed to retain the undulating optical fibre ribbon structure 37 in the elongate compartment 36.

Figure 5:
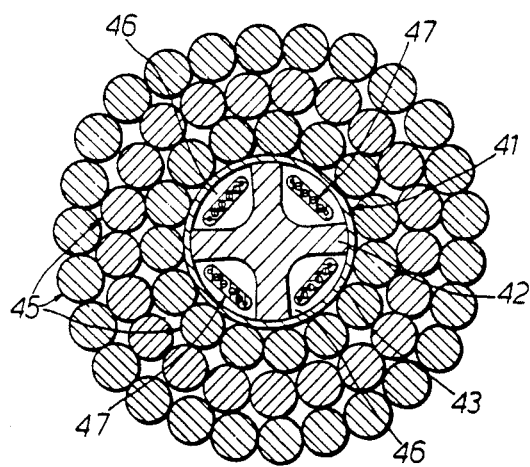

The overhead flexible electric conductor shown in FIG. 5 has a central core 41 consisting of two separately formed parts comprising an inner extruded elongate member 42 of aluminium having in its outer surface four circumferentially spaced, longitudinally extending recesses 46 and, surrounding the inner elongate member, a longitudinally applied, transversely folded tape 43 of aluminium, which strip overlies the longitudinally extending recesses to form circumferentially spaced elongate compartments. Loosely housed in each of the elongate compartments 46 is an undulating optical fibre ribbon structure 47 as shown in FIG. 1. The central core 41 is surrounded by three layers 45 of helically wound round wires of aluminium-based alloy, the directions of lay of adjacent layers being of opposite hand.

In each of the flexible conductors shown in FIGS. 2 to 5, the or each elongate compartment may be substantially filled throughout its length with a silicone gel or with a greasy water-impermeable medium.

What I claim as my invention is:

1. An overhead flexible electric conductor comprising at least one layer of helically wound bare elongate elements of metal or metal alloy, at least one elongate compartment within and extending throughout the length of the flexible conductor and, loosely housed in the elongate compartment, at least one optical fibre ribbon structure comprising a plurality of optical fibres and at least one flexible elongate reinforcing element of substantially resilient material arranged side by side and embedded in an elongate body of plastics material, wherein the resilient reinforcing element of the optical fibre ribbon structure is pre-set in such a form that the ribbon structure as a whole follows a path of smoothly curved undulations whose axes of curvature lie transverse to the longitudinal axis of the ribbon structure and the arrangement being such that if, when the flexible conductor is installed or is in service, the undulating ribbon structure is subjected to a tensile force, the ribbon structure will straighten in a lengthwise direction against the action of the undulating resilient reinforcing element thereby reducing the tensile force otherwise applied to the optical fibres and, when the tensile force is removed, the ribbon structure will return towards its original undulating form.

2. A flexible conductor as claimed in claim 1, wherein the axes of curvature of the undulations in the undulating optical fibre ribbon structure lie parallel to one another and substantially normal to the longitudinal axis of the optical fibre ribbon structure.

3. A flexible conductor as claimed in claim 1, wherein the optical fibre ribbon structure includes at least two elongate reinforcing elements of substantially resilient material uniformly spaced across the width of the ribbon structure.

4. A flexible conductor as claimed in claim 3, wherein the optical fibre ribbon structure includes two flexible elongate reinforcing elements of substantially resilient material, the separate optical fibres being arranged side by side therebetween.

5. A flexible conductor as claimed in claim 1, wherein the flexible resilient reinforcing element of the optical fibre ribbon structure is of metal or metal alloy.

6. A flexible conductor as claimed in claim 1, wherein the flexible resilient reinforcing element of the optical fibre ribbon structure is of a non-metallic resilient material.

7. A flexible conductor as claimed in claim 1, wherein the radius of curvature of each undulation of the undulating optical fibre ribbon structure is not less than 40 mm.

8. A flexible conductor as claimed in claim 1, wherein the elongate compartment is the bore of a substantially circumferentially rigid central core which is surrounded by the layer or layers of helically wound bare elongate elements of metal or metal alloy.

9. A flexible conductor as claimed in claim 8, wherein the central core is a single extruded elongate member having a central bore which constitutes the elongate compartment.

10. A flexible conductor as claimed in claim 9, wherein the single extruded elongate member is of metal or metal alloy.

11. A flexible conductor as claimed in claim 8, wherein the central core is a single elongate member of substantially U-shaped transverse cross-section, the space between the limbs and base of the U constituting the elongate compartment.

12. A flexible conductor as claimed in claim 11, wherein at least one of the limbs of the U is folded inwardly so that the gap between the free ends of the limbs is at least partially closed.

13. A flexible conductor as claimed in claim 8, wherein the central core is a longitudinally extending tape of metal or metal alloy which is transversely folded to form a tube, the abutting longitudinally extending edges of the tape being welded together.

14. A flexible conductor as claimed in claim 8, wherein the central core consists of two separately formed parts comprising an inner solid elongate member of metal or metal alloy having in its outer surface at least one longitudinally extending recess and, surrounding the inner elongate member, a longitudinally applied transversely folded tape of metal or metal alloy, which tape overlies the longitudinally extending recess to form an elongate compartment.

15. A flexible conductor as claimed in claim 14, wherein the inner elongate member of the central core has in its outer surface four circumferentially spaced longitudinally extending recesses which, when surrounded by the transversely folded tape, constitute circumferentially spaced elongate compartments in at least one of which an undulating optical fibre ribbon structure is loosely housed.

16. A flexible conductor as claimed in claim 8, wherein the central core is of substantially circular transverse cross-section.

17. A flexible conductor as claimed in claim 1, wherein those parts of the elongate compartment not occupied by the undulating optical fibre ribbon structure are substantially filled with a water-impermeable medium of such a consistency that the undulating optical fibre ribbon structure is free to move relative to the flexible conductor when the flexible conductor is flexed.

18. A flexible conductor as claimed in claim 1, wherein a layer of thermally insulating material is housed in the elongate compartment and surrounds the undulating optical fibre ribbon structure loosely housed therein.

19. A flexible conductor as claimed in claim 18, wherein the thermally insulating layer in the elongate compartment is a circumferentially continuous layer which is bonded to the boundary surface of the elongate compartment.

20. An overhead electric transmission or distribution system including at least one overhead flexible electric conductor as claimed in claim 1.

21. An overhead electric transmission or distribution system as claimed in claim 20, wherein the overhead flexible electric conductor is an earth conductor of the system.

* * * * *